United States Patent [19]

Sidney et al.

[11] Patent Number: 4,543,268
[45] Date of Patent: Sep. 24, 1985

[54] ELECTRON-BEAM ADHESION-PROMOTING TREATMENT OF POLYESTER FILM BASE FOR MAGNETIC RECORDING MEDIA

[75] Inventors: LuAnn Sidney, White Bear Township, Ramsey County; Stephen R. Ebner, Cottage Grove, both of Minn.

[73] Assignee: Minnesota Mining and Manufacturing Company, St. Paul, Minn.

[21] Appl. No.: 628,154

[22] Filed: Jul. 5, 1984

[51] Int. Cl.[4] .............................................. B05D 3/06
[52] U.S. Cl. ...................................... 427/44; 427/35; 427/129; 427/322
[58] Field of Search .................. 427/35, 44, 129, 322; 204/159.19

[56] References Cited

U.S. PATENT DOCUMENTS

| | | | |
|---|---|---|---|
| 2,863,812 | 12/1958 | Graham | 204/159.19 |
| 2,940,869 | 6/1960 | Graham | 204/159.19 |
| 2,955,953 | 10/1960 | Graham | 117/47 |
| 2,997,419 | 8/1961 | Lauton | 204/159.19 |
| 3,188,229 | 6/1965 | Graham | 204/159.19 |
| 3,188,266 | 6/1965 | Charbonneau et al. | 161/188 |
| 3,284,331 | 11/1966 | McBride et al. | 204/165 |
| 3,607,354 | 9/1971 | Krogh et al. | 117/47 |
| 3,628,987 | 12/1971 | Nakata et al. | 427/208.8 |
| 3,783,004 | 1/1974 | Parker | 204/159.19 |
| 4,128,426 | 12/1978 | Ohta et al. | 427/40 |
| 4,140,607 | 2/1979 | Kreiselmeier et al. | 204/168 |
| 4,210,703 | 7/1980 | Scantlin et al. | 428/130 |

FOREIGN PATENT DOCUMENTS

| | | |
|---|---|---|
| 57-84115 | 5/1982 | Japan . |
| 58-141214 | 8/1983 | Japan . |
| WO82/01099 | 4/1982 | PCT Int'l Appl. . |
| 2055877 | 3/1981 | United Kingdom . |
| 2057471 | 4/1981 | United Kingdom . |

OTHER PUBLICATIONS

Briggs, D., et al., "Surface Modification of Poly(ethylene terephthalate) by Electrical Discharge Treatment", Polymer, Aug. 1980, pp. 895-900.
Rand, W. M., Jr., "Electron Curing of Magnetic Coatings", Radiation Curing, Feb. 1983, pp. 26-31.

Primary Examiner—Richard Bueker
Attorney, Agent, or Firm—D. M. Sell; J. A. Smith; D. B. Little

[57] ABSTRACT

The magnetizable layer of a magnetic recording medium which has a flexible polyester film base is better adhered to the film base and better resists abrasion if the film base is first subjected to electron-beam irradiation while passing through an inert atmosphere such as nitrogen.

15 Claims, 2 Drawing Figures

ELECTRON-BEAM ADHESION-PROMOTING TREATMENT OF POLYESTER FILM BASE FOR MAGNETIC RECORDING MEDIA

FIELD OF THE INVENTION

The invention concerns a magnetic recording medium having a flexible polyester film base, and particularly concerns an adhesion-promoting treatment to enhance the adhesion of a magnetizable layer to a polyester film base. By "polyester film base" is meant (1) biaxially-oriented poly(ethylene terephthalate) film obtained from ethylene glycol and dimethyl terephthalate or terephthalic acid and (2) biaxially-oriented films of related polyesters.

CROSS-REFERENCES TO RELATED APPLICATIONS

This application is closely related to two applications of even filing date, one entitled "Electron-beam Adhesion-Promoting Treatment of Polyester Film Base" (Ser. No. 627,812) and the other entitled "Electron-Beam Adhesion-Promoting Treatment of Polyester Film Base for Silicone Release Liners" (Ser. No. 628,153).

BACKGROUND ART

The backing of nearly every flexible magnetic recording medium is a biaxially-oriented poly(ethylene terephthalate) film base. The magnetizable layer of such a medium does not adhere well to polyester film base unless the film base first receives an adhesion-promoting treatment. There are a variety of such treatments. Because of its low cost, the leading treatment may be corona discharge even though it is only partially effective. Furthermore, because the treatment is transitory, any magnetizable layer must be promptly applied to the treated polyester film base. Corona discharge treatment of poly(ethylene terephthalate) film is discussed in an article by Briggs et al.: "Surface Modification of Poly-(ethylene terephthalate) by Electrical Discharge Treatment", Polymer, 1980, Vol. 21, August, pages 895–900.

Where better adhesion is demanded, the polyester film base may be chemically treated, such as with parachlorophenol as in U.S. Pat. No. 3,607,354, even though this involves a toxicity hazard. Organic priming or subbing coatings which are less toxic can also significantly enhance adhesion, and can be better adhered to the film base by subjecting the coating to ultraviolet irradiation as taught in U.S. Pat. No. 3,188,266 (Charbonneau et al.) and U.S. Pat. No. 4,210,703 (Scantlin et al.). Other adhesion-promoting treatments for polyester film base include spark and other electrical discharges, flame, and physical and/or chemical etching.

U.S. Pat. No. 2,955,953 (Graham) concerns promoting adhesion to any solid organic polymeric substrate by subjecting it in the substantial absence of oxygen to charged particle ionizing radiation having an energy of from 15 to 50,000 electron volts. The accelerated particles may be utilized in a vacuum or pass through a window and be utilized in air or a gas. In the Example, cellophane was irradiated in a cathode ray tube, and only the face of the film exposed to the electron beam exhibited the desired improvement in adhesion. The Graham patent suggests that not more than five minutes should elapse before a coating is applied unless the irradiated substrate "is kept in an inert atmosphere such as under nitrogen, argon, helium or the like and/or is stored at a low temperature such as at −80° C." (column 2, lines 1–6).

Japanese Patent Application No. JA55-160598 (Takada et al.) which was laid open May 26, 1982 concerns the application by vacuum deposition of a magnetizable thin film such as Co/Ni to polyester film. Immediately before applying the magnetizable thin film, the polyester film base is placed in a poly(ethylene terephthalate) tube or bag and subjected to electron-beam radiation having an energy of 2.5 Mev (Examples 1 and 2). Although none of the examples give other conditions of the preirradiation, the final paragraph of the application states that the preirradiation may be conducted in a vacuum container, followed immediately by deposition of the magnetizable thin film to keep the surface of the film base free from moisture and dust. By doing so, the Co/Ni or other magnetizable film is said to adhere better to the polyester film base. See also the claim and the penultimate paragraph immediately preceding Example 1.

It is believed that any known adhesion-promoting treatment of polyester film base which is significantly more effective than corona discharge also is significantly more expensive or involves hazards or both. Accordingly, the need has continued for a more effective treatment at a cost closer to that of corona discharge.

It is difficult to quantify the effectiveness of adhesion-promoting treatments in flexible magnetic recording media. A common test is to bond a magnetizable layer of the medium to a rigid aluminum panel using an epoxy adhesive to create a bond between the layer and the aluminum panel which is stronger than the bond between the layer and the film base. The force required to peel back the film base is recorded as a measure of how well the layer is adhered. Although peel adhesion is meaningful, it may not precisely indicate the resistance of a magnetizable layer to being removed when rubbed, such as when drawn across a magnetic recording head. A better indication of adequate adhesion to resist rubbing or abrasion failure has been obtained by testing the resistance of a magnetizable layer to removal upon being scratched with one's fingernail. The edge of a razor blade pressed vertically across a relatively moving magnetic recording layer can also provide a good indication of the resistance of the layer to removal when subjected to the sort of rubbing a recording medium encounters in use.

OTHER PRIOR ART

It has been suggested to manufacture a magnetic recording medium using an electron beam to cure the binder of a magnetizable layer. See, for example, UK Patent Applications Nos. GB 2,057,471A, and GB 2,055,877A of Sony Corp. and PCT Patent Application No. PCT/US81/01276 of Ampex Corp. The Sony applications employ a polyester film base, while no mention has been found in the Ampex application of the identity of the nonmagnetic substrate of its medium. However, experiments suggest that electron-beam curing would not enhance the adhesion of a magnetizable layer to an underlying polyester film base.

DISCLOSURE OF INVENTION

The present invention concerns the manufacture of a magnetic recording medium comprising a flexible polyester film base and a thin magnetizable layer, and specifically concerns an adhesion-promoting treatment of that film base which is free from toxic hazards, can be applied at a cost close to that of corona discharge treatment, and is believed to be at least as effective as is any presently commercial adhesion-promoting treatment. The invention is believed to provide the only adhesion-promoting treatment for polyester film base that can simultaneously enhance adhesion of magnetizable layers to both faces of the film base even though directed toward only one of its faces.

In the manufacture of a magnetic recording medium, the adhesion-promoting treatment of the invention involves the steps of (1) continuously passing uncoated polyester film base through an inert atmosphere while (2) exposing the film base to irradiation by an electron beam to subject the film base to an absorbed dosage of at least 2 Mrad, and (3) applying a thin magnetizable layer to a face of the film base to which adhesion of the layer has been enhanced by virtue of steps (1) and (2). Steps (1) and (2) promote the adhesion of a magnetizable layer to at least the face of the film base that faces the electron-beam radiation. The term "uncoated" refers at least to that face of the polyester film base to which a magnetizable layer is to be applied. By "inert atmosphere" is meant an environment comprising flue gas, nitrogen, or a gas of Group O of the Periodic Table and containing no more oxygen than 100 parts per million. A preferred inert atmosphere is nitrogen. Argon has been shown to be equally useful in practicing the present invention.

The invention is especially useful in the manufacture of magnetic recording media, the magnetizable layers of which comprise magnetizable particles dispersed in organic binder.

Tests indicate that the effectiveness of the adhesion-promoting treatment of the invention does not change during prolonged storage, so that a magnetizable layer may be applied to an adhesion-promoted surface either immediately or after prolonged storage in air at ordinary room temperatures, with equivalent results. Such tests have involved delays of several months.

For treating polyester film base having a thickness range from 25 to 250 micrometers, the electron beam preferably has an accelerating voltage of at least 150 keV, more preferably at least 200 keV. Thinner polyester film base may be effectively treated at lower accelerating voltages, while thicker polyester film base may require higher accelerating voltages to enhance the adhesion of magnetizable layers to both of its faces.

Optimum results have been obtained at dosages between 5 and 10 Mrad. A useful dosage range may be from 2 to 20 Mrad. Below 3 Mrad, the novel adhesion-promoting treatment has been marginally effective. Dosages above 10 Mrad produce little, if any, advantage as compared to lower dosages and also involve the hazard of possibly overheating the film base. This hazard may be reduced by irradiating the film base while in contact with a water-cooled chill roll, but when doing so, adhesion only to the noncontacting face of the film base may be satisfactorily enhanced.

Except when a surface of a polyester film base contacts a metal roll during the adhesion-promoting treatment of the invention, the treatment improves the adhesion of a magnetizable layer to either face of the film base except possibly at low accelerating voltages.

Tests to date indicate that the oxygen content of the inert atmosphere should be as low as possible. Excellent adhesion of a magnetizable layer has been realized when the oxygen level of the inert atmosphere was between 10 and 40 parts per million, and the best results have been obtained at the lowest oxygen levels. At the present time it may be unduly expensive to attempt to operate at levels substantially below 5 parts per million.

For economy, the adhesion-promoting treatment of the invention preferably is carried out at approximately atmospheric pressure and at web speeds of at least 100 meters per minute. Web speeds exceeding 200 meters per minute have been successfully used. Below 30 meters per minute might be too slow to be commercially feasible.

Because poly(ethylene terephthalate) is believed to be the only presently commercial polyester film base, it has been used in all work on the invention, but equivalent polyester film base should experience the same results.

The invention should be especially useful in the manufacture of flexible magnetic recording disks used in diskettes where repeated sliding contact with magnetic recording heads requires better adhesion than can be provided by corona discharge. Excellent adhesion is also required of magnetic recording media in videocassette tape use, especially for resisting the prolonged rubbing encountered in stop motion. While capital equipment for the novel adhesion-promoting treatment would be far more expensive than is corona discharge equipment, operating costs should be comparable, and the huge size of magnetic recording media markets should reduce capital costs to a small fraction of operating costs.

Figure 1:
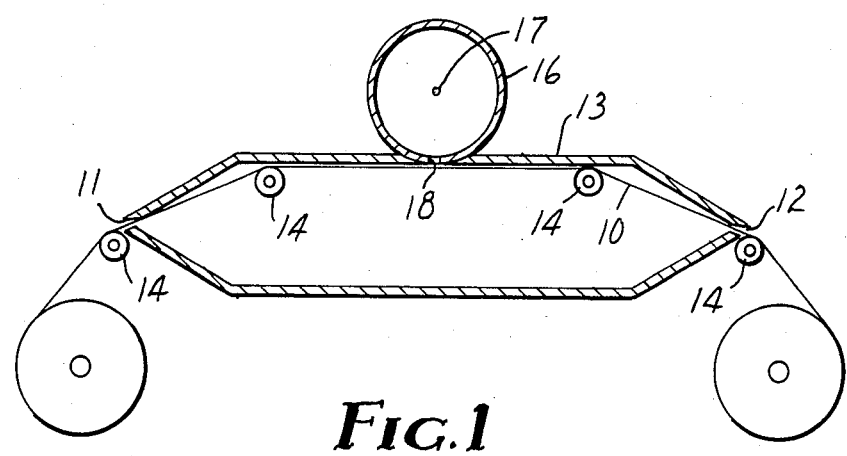
FIG. 1 schematically illustrates apparatus for applying to polyester film base the adhesion-promoting treatment of the invention.

The apparatus shown in FIG. 1 is schematically illustrated in greater detail in "Radiation Curing", February 1983, page 30. An essentially identical apparatus is schematically illustrated in "Adhesives Age", December 1982, page 28.

In FIG. 1 of the present drawing, a polyester film base 10 is guided by idler rolls 14 through narrow slits 11 and 12 of a chamber 13. The slits serve as exhausts for nitrogen being pumped into the chamber. Mounted over a metallic foil window 18 of the chamber 13 is a vacuum chamber 16 containing a linear filament electron source 17. After being irradiated through the window 18, the film base 10 is wound upon itself into a roll.

Figure 2:
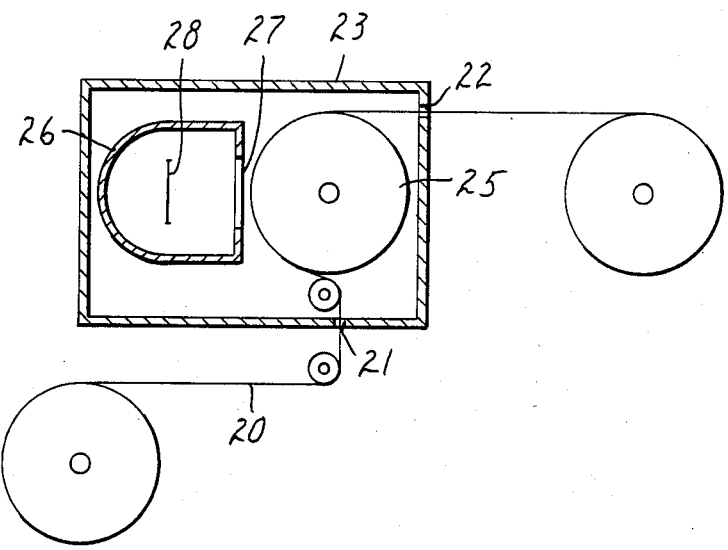
FIG. 2 schematically illustrates another apparatus for applying the adhesion-promoting treatment of the invention.

In FIG. 2, a roll of polyester film base 20 is transported through slits 21 and 22 of a chamber 23 and around a chrome-plated steel chill roll 25 mounted in the chamber. While in contact with the chill roll, the film is irradiated through a metallic foil window 27 of an electron-beam apparatus 26 which contains a series of small parallel filaments, one 28 of which is shown.

FINGERNAIL TEST

The degree of adhesion of a magnetizable layer to polyester film base may be tested by laying the film base against a hard, smooth surface, magnetizable layer up and scraping the layer with one's fingernail over a distance of about 20 cm. The film base is then held up to a light and its adhesion is evaluated as follows:

| | |
|---|---|
| No observable removal | Excellent |
| Pinhole removal | Good |
| Partial removal in streaks | Fair |
| Complete removal | Poor |

RAZOR BLADE TEST

A magnetic recording medium is laid magnetizable layer up over a thin cardboard surface which provides some resilience. A razor blade is lightly pressed at 90° against the layer and then moved in that attitude across about 20 cm while maintaining the light pressure. The medium is then held up to a light and evaluated for adhesion as follows:

| | |
|---|---|
| No observable removal | Excellent |
| Isolated removal | Good |
| Removal of patches | Fair |
| Substantially complete removal | Poor |

ADHESION TEST

Room-temperature-curing epoxy resin is used to adhere a magnetizable layer of 1.3 cm wide magnetic recording tape to a rigid aluminum panel which is 15 cm long and 2.5 cm wide. A free end of the tape is attached to one jaw of an Instron tensile tester and the panel is attached to the other jaw. With the jaws moving apart at 50 cm per minute, the force to peel back the tape at 180° in the lengthwise direction of the aluminum panel is measured.

EXAMPLES 1-4

A long roll of biaxially-oriented poly(ethylene terephthalate) film base having a width of 10 cm and a thickness of 75 micrometers was transported at substantially atmospheric pressure at 12 m/min. through apparatus similar to that shown in FIG. 1 and equipped with an ESI "Electrocurtain" electron-beam apparatus having a width of 17.8 cm. The distance from the window to the film base was about 2.5 cm. Dry nitrogen containing about 40 parts per million oxygen was forced into the chamber at a rate of 0.36 m$^3$/min. The apparatus was operated at an accelerating voltage of 175 keV to provide absorbed dosage levels of 2, 5, 8 and 10 Mrad.

Onto each face of treated polyester film base, a magnetizable coating was applied to rotogravure from organic solvent and heated to provide a dry layer about 3.6 micrometers in thickness. Each magnetizable layer comprised 66% by weight of acicular iron oxide particles having an average length of 0.6 micrometer and an aspect ratio of about 8:1. The binder comprised polyurethane elastomer, phenoxy resin and other ingredients substantially as described in the Comparative Example of U.S. Pat. No. 4,210,703.

After the binder had cured, each magnetizable layer was tested as reported in Table A. The results reported for the Fingernail Test are a consensus of testing by two persons.

TABLE A

| | | Fingernail Test | | Razor Blade Test | | Adhesion Test (N/100 mm)* | |
|---|---|---|---|---|---|---|---|
| Example | Dosage (Mrad) | (Coating on face toward e-beam) | (Coating on face away from e-beam) | (Coating on face toward e-beam) | (Coating on face away from e-beam) | (Coating on face toward e-beam) | (Coating on face away from e-beam) |
| 1 | 2 | good | good | good | excellent | 3.2 | 2.3 |
| 2 | 5 | good | good | good | excellent | 4.0 | 3.5 |
| 3 | 8 | good | good | excellent | excellent | 4.1 | 3.5 |
| 4 | 10 | good | good | excellent | excellent | 4.2 | 3.4 |
| Control | 0 | poor | poor | poor | poor | NT | 0.8 |

*Average of three measurements
NT = Not Tested

The magnetizable layers tested as reported in the Table A were applied to polyester film base within a week after the novel adhesion-promoting treatment. Other portions of the film base were stored for several months in air at ordinary room temperatures before being coated. Partial testing showed equally good results as compared to the data reported in Table A.

When Example 1 was partially repeated at lower oxygen levels in the nitrogen atmosphere, better scratch resistance (as indicated by the Fingernail Test and the Razor Blade Test) and better values in the Peel Adhesion Test were obtained.

EXAMPLES 5-8 AND 5X-8X

The procedure of Examples 1-4 was repeated, except at accelerating voltages of both 157 and 175 keV. Test results are reported in Table B. Examples 5-8 differ from Examples 5X-8X, respectively, only in the accelerating voltage; and Examples 5-8 precisely repeat Examples 1-4, respectively.

TABLE B

| | | | Fingernail Test | | Razor Blade Test | | Adhesion Test N/100 mm)* | |
|---|---|---|---|---|---|---|---|---|
| Example | Accel. voltage | Dosage (Mrad) | (Coating on face toward e-beam) | (Coating on face away from e-beam) | (Coating on face toward e-beam) | (Coating on face away from e-beam) | (Coating on face toward e-beam) | (Coating on face away from e-beam) |
| 5 | 175 | 2 | good | poor | excellent | poor | 2.3 | 1.1 |
| 5X | 157 | 2 | good | poor | excellent | poor | 2.2 | 1.1 |
| 6 | 175 | 5 | excellent | good | excellent | excellent | 2.6 | 2.4 |
| 6X | 157 | 5 | good | fair | excellent | good | 2.2 | 2.2 |
| 7 | 175 | 8 | excellent | good | excellent | excellent | 2.5 | 2.7 |
| 7X | 157 | 8 | excellent | good | excellent | excellent | 2.2 | 2.7 |
| 8 | 175 | 10 | excellent | good | excellent | excellent | 2.4 | 2.8 |

TABLE B-continued

| Example | Accel. voltage | Dosage (Mrad) | Fingernail Test (Coating on face toward e-beam) | Fingernail Test (Coating on face away from e-beam) | Razor Blade Test (Coating on face toward e-beam) | Razor Blade Test (Coating on face away from e-beam) | Adhesion Test N/100 mm* (Coating on face toward e-beam) | Adhesion Test N/100 mm* (Coating on face away from e-beam) |
| --- | --- | --- | --- | --- | --- | --- | --- | --- |
| 8X | 157 | 10 | excellent | good | excellent | excellent | 2.4 | 2.8 |

*Average of three measurements

EXAMPLES 9-11

Polyester film base identical to that used in Examples 1-4 was transported at substantially atmospheric pressure through the apparatus of FIG. 2 at a speed of 30 m/min with the chill roll maintained at about 8° C. The apparatus included a RPC Industries "Broad-Beam" electron-beam device which has a titanium foil window and contains a series of small parallel filaments and was operated at an accelerating voltage of 200 keV to provide absorbed dosages of 2, 5 and 8 Mrad. Dry nitrogen containing 10 parts per million oxygen was forced into the chamber during the irradiation.

Magnetizable layers were applied to both faces of each film base as in Example 1. The dried thickness of each layer was about 2.5 micrometers. In every case, the magnetizable layer on the face which contacted the chill roll exhibited poor scratch resistance so that only the Fingernail Test results of the other magnetizable layer are reported in Table C. As compared to values reported for Example 1, the lower values in the Adhesion test for the magnetizable layers on the faces toward the beam may have been due in part to their lesser thicknesses.

TABLE C

| Example | Dosage (Mrad) | Fingernail Test | Adhesion Test (N/100 mm) (coating on face toward e-beam) | Adhesion Test (N/100 mm) (coating on face away from e-beam) |
| --- | --- | --- | --- | --- |
| 9 | 2 | good | 1.4 | 0.5 |
| 10 | 5 | excellent | 1.8 | 0.5 |
| 11 | 8 | excellent | 1.7 | 0.8 |
| Control | 0 | poor | 0.5 | 0.5 |

We claim:

1. In the manufacture of a magnetic recording medium comprising a flexible polyester film base and a thin magnetizable layer, a method for promoting the adhesion to the polyester film base of the magnetizable layer, which method comprises the steps of (1) continuously passing uncoated polyester film base through an inert atmosphere containing no more than 100 ppm oxygen while (2) exposing the film base to irradiation by an electron beam to subject the film base to an absorbed dosage of at least 2 Mrad and (3) applying a thin magnetizable layer containing an organic binder to a surface of the film base to which adhesion of the layer has been enhanced by virtue of steps (1) and (2).

2. Method as defined in claim 1 wherein the magnetizable layer applied in step (3) comprises magnetizable particles dispersed in organic binder.

3. Method as defined in claim 2 wherein said binder comprises polyurethane elastomer and phenoxy resin.

4. Method as defined in claim 1 wherein the dosage does not exceed 20 Mrad.

5. Method as defined in claim 4 wherein the dosage is from 5 to 10 Mrad.

6. Method as defined in claim 1 wherein the inert atmosphere is substantially nitrogen.

7. Method as defined in claim 1 wherein the inert atmosphere contains less than 40 ppm oxygen.

8. Method as defined in claim 7 wherein the polyester film base is at approximately atmospheric pressure during steps (1) and (2).

9. Method as defined in claim 1 wherein the polyester film base is continuously irradiated in step (2) at a web speed of at least 100 meters per minute.

10. Method as defined in claim 1 wherein the polyester is poly(ethylene terephthalate).

11. Method as defined in claim 10 wherein the film base is unsupported while being irradiated in step (2), and the adhesion of magnetizable layers to both faces of the film base is enhanced.

12. Method as defined in claim 10 wherein the polyester film base contacts a metal surface while being irradiated in step (2), and adhesion to only the noncontacting face of the film base is satisfactorily enhanced.

13. Method as defined in claim 1 wherein the magnetizable layer is applied in step (3) to the surface of the film base which faced the electron-beam radiation in step (2).

14. The method of claim 1 wherein the electron beam has an accelerating voltage of at least 150 kiloelectron volts.

15. The method of claim 1 wherein the film base is biaxially oriented polyester.

* * * * *